United States Patent
MacLellan et al.

(10) Patent No.: US 8,028,029 B2
(45) Date of Patent: Sep. 27, 2011

(54) METHOD AND APPARATUS FOR CONTEXT-SENSITIVE EXCHANGE OF ELECTRONIC INFORMATION

(75) Inventors: Scot MacLellan, Rome (IT); Luigi Pichetti, Rome (IT); Rosario Gangemi, Anzio (IT)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 12/121,272

(22) Filed: May 15, 2008

(65) Prior Publication Data

US 2009/0287778 A1 Nov. 19, 2009

(51) Int. Cl.
*G06F 13/00* (2006.01)

(52) U.S. Cl. .......... 709/206; 709/219; 709/223

(58) Field of Classification Search ............ 709/204, 709/206, 217, 219, 223
See application file for complete search history.

(56) References Cited

U.S. PATENT DOCUMENTS

| 5,557,723 | A | 9/1996 | Holt et al. |
| 5,627,997 | A | 5/1997 | Pearson et al. |
| 6,085,201 | A | 7/2000 | Tso |
| 6,192,396 | B1 | 2/2001 | Kohler |
| 6,446,115 | B2 * | 9/2002 | Powers ............ 709/206 |
| 6,510,453 | B1 | 1/2003 | Apfel et al. |
| 6,529,942 | B1 | 3/2003 | Gilbert |
| 6,779,178 | B1 | 8/2004 | Lloyd et al. |
| 7,272,637 | B1 | 9/2007 | Himmelstein |
| 2005/0055627 | A1 | 3/2005 | Lloyd et al. |
| 2006/0161986 | A1 | 7/2006 | Singh et al. |
| 2006/0288219 | A1 * | 12/2006 | Adams et al. ............ 713/176 |
| 2008/0040435 | A1 | 2/2008 | Buschi et al. |
| 2009/0254858 | A1 * | 10/2009 | McCaffrey et al. ........ 715/810 |

FOREIGN PATENT DOCUMENTS

WO 01/37123 A2 5/2001

OTHER PUBLICATIONS eMill: eMailing Software for Newsletters, Sales & direct Marketing by eMail, Fax or SMS, http://www.emill.net/email-marketing-software.html?L=47, p. 1, downloaded May 14, 2008.
eMill. Permission email marketing software with unlimited personalization of content and delivery; http://www.activeplus.com/us/products/emill/, pp. 1-3, downloaded May 14, 2008.

* cited by examiner

*Primary Examiner* — Viet Vu
(74) *Attorney, Agent, or Firm* — Myers Andras Sherman & Zarrabian LLP

(57) ABSTRACT

A method and apparatus for context-sensitive exchange of electronic information, is provided. One implementation involves maintaining multiple signatures for a sender; associating each signature with a recipient address or communication content pattern described based on a rule; sending an electronic communication to a recipient address by automatically selecting a most appropriate signature among the multiple signatures based on the recipient address or content pattern in the communication; and including the selected signature in the electronic communication.

1 Claim, 2 Drawing Sheets

METHOD AND APPARATUS FOR CONTEXT-SENSITIVE EXCHANGE OF ELECTRONIC INFORMATION

BACKGROUND OF THE INVENTION

1. Field of the Invention

The present invention relates generally to exchange of electronic information and in particular to context-sensitive exchange of electronic information.

2. Background Information

Conventional collaboration tools provide the possibility to have often used phrases (or images) automatically included in a document or electronic mail (email). For example, email documents mostly always end with a signature, where the author provides his/her name, job title, contact information, etc. Such collaboration tools allow a signature to be stored, and automatically include the signature text at the bottom of any new email or when replying to, or forwarding, a received mail. However, a single signature is not always appropriate for all purposes. When sending a formal business email, it is appropriate to include job title and contact information, but when sending an informal email to a friend it would be considered overly formal. When sending email to a university or research organization, a signature that includes academic qualifications and achievements is appropriate, but that may be considered pompous in other contexts. With such limitations, the most often used signature is stored, and then it is modified manually each time an email is to be sent to a person or group for which that signature is not appropriate.

SUMMARY OF THE INVENTION

A method and apparatus for context-sensitive exchange of electronic information is provided. One embodiment involves maintaining multiple signatures for a sender; associating each signature with one or more of: at least a recipient address or communication content pattern described based on a rule; sending an electronic communication to a recipient address by automatically selecting a most appropriate signature among the multiple signatures based on one or more of: the recipient address or content pattern in the communication; and including the selected signature in the electronic communication.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Figure 1:
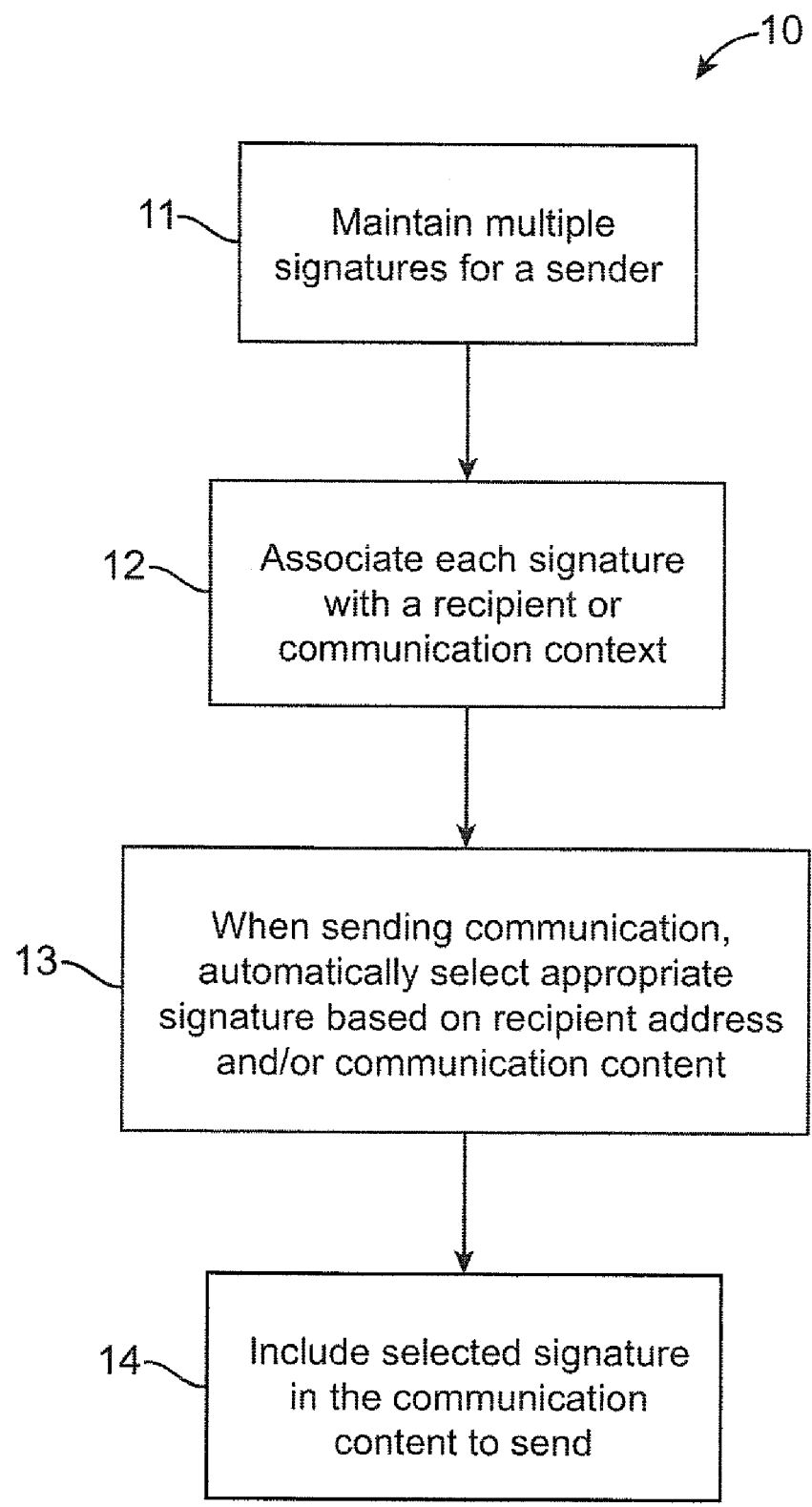
FIG. 1 shows a process for context-sensitive exchange of electronic information, according to an embodiment of the invention.

A method and apparatus for context-sensitive exchange of electronic information, is provided. FIG. 1 shows a process 10 for context-sensitive exchange of electronic information according to an embodiment of the invention. The process 10 includes:

Block 11: Maintaining multiple signatures for a sender.

Block 12: Associating each signature with one or more of: at least a recipient address or communication content pattern described based on a rule (providing context).

Block 13: When sending an electronic communication to a recipient address, automatically selecting a most appropriate signature among the multiple content pattern in the communication.

Block 14: Including the selected signature in the electronic communication.

Figure 2:
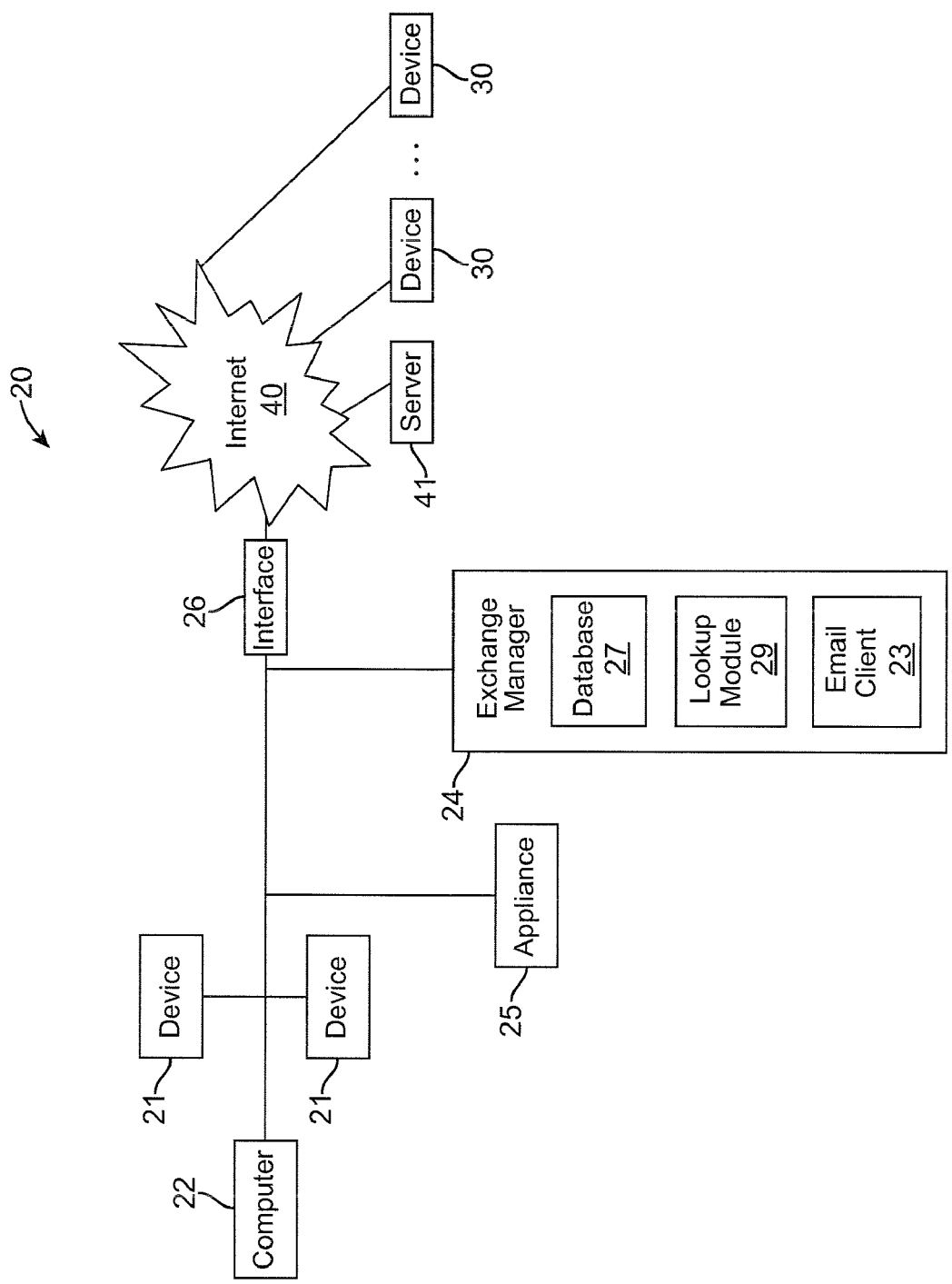
FIG. 2 shows a functional architecture of a system implementing context-sensitive exchange of electronic information, according to an embodiment of the invention.

FIG. 2 shows an example functional architecture implementing the invention. A system 20 includes a network including devices 21, such as consumer electronics (e.g., mobile device, PDA), a personal computer (PC) 22, an appliance 25 and an interface 26 that connects the network to an external network 40 (e.g., another local network, the Internet). The external network 40 is connected to a server 41 and multiple devices 30 (e.g., PC, mobile device, PDA). In one example, the PC 22 functions as a sender of communication content to one or more recipients in the network (e.g., a device 21) or one or more recipients outside the network (e.g., a device 30).

The network further includes an exchange manager 24 that functions to maintain multiple signatures, wherein each signature is associated with a recipient address, or with a text pattern described using a simple rule. In one example implementing a context-sensitive email text autofill function, the exchange manager 24 recognizes the destination address (e.g., address of a device 30) or purpose of an email generated from a sender device (e.g., PC 22), and automatically selects the most appropriate signature as defined by the address or pattern association. This functionality is also applicable to fields other than the signature field of an email, allowing many text blocks to be automatically filled based on the content of associated blocks.

Although the exchange manager 24 is shown as a standalone module servicing the devices in the network (e.g., acting as a component of an email server), in another example the exchange manager 24 can be a software component which executes in a device (e.g., PC 22). Indeed, each device (e.g., 21, 22, 25, 30) that is capable of sending and receiving email can include an exchange manager 24. In one example, the exchange manager 24 functions to manage exchange of emails between senders and recipients.

The exchange manager 24 stores in a database 27 multiple signatures for a user and associates each signature with e.g., a recipient email address, or with a text pattern described using a simple rule. When a user sends an email, or replies to, or forwards a received email, the exchange manager 24 recognizes the recipient address or purpose of the email based on said pattern association rule. The exchange manager 24 then selects the most appropriate signature as defined by the recipient address or pattern association. The exchange manager 24 automatically includes the selected (appropriate) signature text at the bottom of the email.

One example operation scenario is described hereinbelow. Many documents have well-identified text blocks already included in the base document format. For example, most word processing applications provide pre-formatted templates that include a series of text blocks with a pre-defined formatting in terms of position within the document, font size, style and color, etc. A template for a business letter will have a text block for the date, the recipient company name and address, the sender company name and address, a reference number or code, an opening phrase, the main body of the letter, a closing phrase, the signature, and possibly a logo. A template for a resume will have other text blocks (e.g., personal data, academic achievements, work history, etc.). The exchange manager 24 provides an association table that maintains associations between the different text blocks, and rules for prefilling the text blocks, based on association rules. An example is

TABLE 1

| Commanding Block (A) | Dependent Block (B) | Rule |
| --- | --- | --- |
| Recipient Address | Opening Phrase | IF A CONTAINS "Acme, Ltd." THEN B = "Dear Sir/Madam" |
| Recipient Address | Closing Phrase | IF A CONTAINS "Acme, Ltd." THEN B = "Yours faithfully" |
| Recipient Address | Signature | IF A CONTAINS "Acme, Ltd." THEN B = MySignature.JPG |
| Recipient Address | Opening Phrase | IF A CONTAINS "John Smith" THEN B = "Dear Mr. Smith" |
| Recipient Address | Closing Phrase | IF A CONTAINS "John Smith" THEN B = "Yours sincerely" |
| Recipient Address | Signature | IF A CONTAINS "John Smith" THEN B = "Robert Jones" |
| Recipient Address | Opening Phrase | IF A CONTAINS "Mario" THEN B = "Caro Mario" |
| Recipient Address | Closing Phrase | IF A CONTAINS "Mario" THEN B = "Ciao" |
| Recipient Address | Signature | IF A CONTAINS "Mario" THEN B = "Bob" |

The exchange manager 24 invokes a lookup module 29 any time that text is entered into any of the predefined text blocks. If the text block is identified in the Commanding Block column, then the rule defined in the Rule column is applied. If the condition of the rule is matched, then the corresponding action is performed on the corresponding Dependent Block. Other rules for different associations may be used.

One example implementation of the invention is based on association between recipient and signature in an email system for automatic selection of appropriate signature. This can be applied to any kind of document that has well-defined fields. Further, in this example of the rule, the rule may be customized to leverage attributes declared in external People-Directories to which an email client 23 has access to. One example involves recognizing that individuals a user is emailing to, are declared in an employee directory as "Executive IT Architect" and then act accordingly in formulating closing phrase or signature.

The invention provides the ability to leverage a set of pre-customized assets (e.g., text, images, tags, pre-built sentences) which can be placed in relationship with attributes of a new/incoming document (e.g., email attributes, or ConditioningBlocks) in a value-based/role-based fashion, so to generate a customized and context-sensitive document. This may be rendered for email documents, but is not limited thereto.

In another example, the exchange manager 24 maintains a catalog of pre-saved objects such as text blocks or other digital assets such as images, along with relationships between the objects. The exchange manager 24 automatically pre-fills a document section with the appropriate objects depending on choices made for previous document sections. The associations between the different objects, and the automation of including the objects in the document depending on the inclusion or otherwise of related objects is an advantage provided by the invention. The invention is applicable to any type of document and not specifically to mail only. The invention automates the way in which the content of a document is pre-filled according to the choices of the author and/or certain rules that link different document object instances.

The exchange manager 24 maintains a catalog in the database that saves pre-defined content for a number of forms (or other document objects), relationships between instances of the objects, and then applies conditional logic to select and automatically fill the document forms according to content entered in a different form. The exchange manager 24 automates prefilling other document sections.

As is known to those skilled in the art, the aforementioned example embodiments described above, according to the present invention, can be implemented in many ways, such as program instructions for execution by a processor, as software modules, as computer program product on computer readable media, as logic circuits, as silicon wafers, as integrated circuits, as application specific integrated circuits, as firmware, etc. Though the present invention has been described with reference to certain versions thereof; however, other versions are possible. Therefore, the spirit and scope of the appended claims should not be limited to the description of the preferred versions contained herein.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for context-sensitive exchange of electronic communication, the electronic communication comprising a header and a body, the method comprising:
    maintaining multiple signatures for a sender;
    associating each signature with communication content pattern described based on a rule;
    sending an electronic communication to a recipient address by automatically selecting a most appropriate signature among the multiple signatures based on content pattern comprising text in the body of the electronic communication; and
    including the selected signature in the electronic communication.

* * * * *